(12) United States Patent
Stollwerck et al.

(10) Patent No.: US 10,819,097 B2
(45) Date of Patent: Oct. 27, 2020

(54) COVER ASSEMBLY WITH HYBRID CORE STRUCTURE

(71) Applicant: 3M INNOVATIVE PROPERTIES COMPANY, St. Paul, MN (US)

(72) Inventors: Gunther A. J. Stollwerck, Krefeld (DE); Michael Petry, Dinslaken (DE); Johannes Fink, Bergheim (DE); Werner Roehling, Hueckelhoven (DE); Christopher J. Evoniuk, Austin, TX (US); Russell L. Kelly, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/485,495

(22) PCT Filed: Feb. 27, 2018

(86) PCT No.: PCT/IB2018/051241
§ 371 (c)(1),
(2) Date: Aug. 13, 2019

(87) PCT Pub. No.: WO2018/163018
PCT Pub. Date: Sep. 13, 2018

(65) Prior Publication Data
US 2020/0052477 A1   Feb. 13, 2020

Related U.S. Application Data

(60) Provisional application No. 62/469,611, filed on Mar. 10, 2017.

(51) Int. Cl.
*H02G 15/18*   (2006.01)

(52) U.S. Cl.
CPC .................. *H02G 15/1826* (2013.01)

(58) Field of Classification Search
CPC combination set(s) only.
See application file for complete search history.

(56) References Cited

U.S. PATENT DOCUMENTS 2,136,942 A * 11/1938 Freeze .................. B21C 37/124
  72/50
2,745,897 A *  5/1956 Nicholas .............. H02G 15/064
  174/73.1

(Continued)

FOREIGN PATENT DOCUMENTS

WO   WO 1996-24977   8/1996
WO   WO 2015-034800  3/2015

OTHER PUBLICATIONS

International Search Report for PCT International Application No. PCT/IB2018/051241, dated Nov. 16, 2018, 3 pages.

*Primary Examiner* — Binh B Tran
*Assistant Examiner* — Krystal Robinson
(74) *Attorney, Agent, or Firm* — Gregg H. Rosenblatt

(57) ABSTRACT

An assembly for covering at least a portion of a cable, such as an electric cable, comprises an elastomeric tube and a hybrid support core structure. The hybrid core structure includes a central core structure formed from a spirally wound separable ribbon that supports a central portion of the elastomeric tube in a radially expanded state, and first and second solid end core structures that support first and second end portions of the elastomeric tube in a radially expanded state. Each solid end core structure has a film disposed on at least an inner surface thereof having a coefficient of friction less than or equal to 0.05.

6 Claims, 1 Drawing Sheet

(56) References Cited

U.S. PATENT DOCUMENTS

| | | | | |
|---|---|---|---|---|
| 2,924,641 A * | 2/1960 | Priaroggia | H02G 15/064 | 174/73.1 |
| 2,967,901 A * | 1/1961 | Priaroggia | H02G 15/25 | 174/73.1 |
| 3,329,765 A * | 7/1967 | Juhlin | H02G 15/06 | 174/76 |
| 3,356,788 A * | 12/1967 | Callahan | H02G 15/103 | 174/73.1 |
| 3,515,798 A | 6/1970 | Sievert | | |
| 4,142,592 A * | 3/1979 | Brusselmans | H02G 15/1806 | 174/92 |
| 4,289,553 A * | 9/1981 | Nolf | B23P 11/025 | 156/86 |
| 4,797,509 A * | 1/1989 | Cook | H01R 4/20 | 156/49 |
| 4,961,978 A * | 10/1990 | Doheny, Jr. | B32B 27/34 | 428/40.4 |
| 5,271,975 A * | 12/1993 | Solano | B29C 53/083 | 174/74 A |
| 5,800,886 A * | 9/1998 | Vallauri | B29C 53/582 | 428/35.8 |
| 5,844,170 A * | 12/1998 | Chor | H02G 15/068 | 174/74 A |
| 5,925,427 A | 7/1999 | Sadlo | | |
| 6,103,975 A * | 8/2000 | Krabs | H02G 15/103 | 174/74 A |
| 6,189,575 B1 * | 2/2001 | Ions | B29C 61/065 | 138/106 |
| 6,340,794 B1 * | 1/2002 | Wandmacher | H02G 15/068 | 174/73.1 |
| 6,738,566 B2 * | 5/2004 | Pagnella | F24H 1/142 | 392/472 |
| 6,911,596 B2 * | 6/2005 | Ohtsubo | B29C 61/065 | 174/36 |
| 7,511,222 B2 * | 3/2009 | Taylor | H02G 15/1826 | 174/84 R |
| 7,719,400 B1 * | 5/2010 | Bernier | H01C 3/20 | 338/25 |
| 7,863,521 B2 * | 1/2011 | Campbell | H02G 15/1826 | 174/93 |
| 8,445,783 B2 * | 5/2013 | Taylor | H02G 15/1833 | 174/93 |
| 8,889,989 B2 * | 11/2014 | Maher | H02G 15/064 | 174/77 R |
| 9,224,520 B2 * | 12/2015 | Spalding | H02G 15/196 | |
| 9,716,378 B2 * | 7/2017 | Wu | H01B 7/22 | |
| 9,728,949 B2 * | 8/2017 | Moore | H02G 15/013 | |
| 2003/0124285 A1 * | 7/2003 | Hopcus | B29C 61/065 | 428/36.9 |
| 2003/0141094 A1 * | 7/2003 | Hofmann | H02G 15/013 | 174/84 R |
| 2004/0262025 A1 | 12/2004 | Brandt | | |
| 2005/0269124 A1 | 12/2005 | Suzuki | | |
| 2006/0213678 A1 * | 9/2006 | Kamel | H02G 15/1833 | 174/73.1 |
| 2010/0012350 A1 * | 1/2010 | Hardi | H02G 1/14 | 174/135 |
| 2010/0307821 A1 * | 12/2010 | Simonsohn | H02G 15/182 | 174/74 A |
| 2011/0100671 A1 * | 5/2011 | Seraj | H02G 15/1813 | 174/68.1 |
| 2016/0329695 A1 | 11/2016 | Yaworski | | |
| 2017/0085075 A1 * | 3/2017 | Yaworski | H02G 15/188 | |

\* cited by examiner

COVER ASSEMBLY WITH HYBRID CORE STRUCTURE

BACKGROUND

Field of the Invention

The present invention is directed to a cover assembly having an elastomeric tube placed in a radially stretched condition using a hybrid core structure.

Related Art

Cable closure or cover assemblies are known in the art and commonly include thermoplastic ("heat shrink") tubes, and elastomeric ("cold shrink") tubes. Both of these technologies are used to form coverings for splices, terminations and repairs of various cables, including power and telecommunications (copper and optical fiber). One of the earliest cold shrink assemblies is shown in U.S. Pat. No. 3,515,798, which shows a pre-stretched tube (PST) loaded on a removable core. The core is a flat strip which has been formed into a helical support or form, having a diameter which is greater than the diameter of the elastomeric tube in its relaxed state. In this radially expanded state, the PST assembly may be placed about a cable and, as the core is gradually removed, the tube collapses about the cable.

In addition to cores formed with removable helical strips, solid cores that are removed in a sliding manner are also known. These type of cores typically require exertion of a strong axial pulling force to remove the core. Also, conventional solid cores can be limited to use with lower recovery force elastomers, having additional tooling required to leverage the additional human required force, and requiring molded tapered and textured profiles to enable deployment of the elastomeric material.

SUMMARY

According to one embodiment of the present invention, an assembly for covering at least a portion of a cable, such as an electric cable, comprises an elastomeric tube and a hybrid support core structure. The hybrid core structure includes a central core structure formed from a spirally wound separable ribbon that supports a central portion of the elastomeric tube in a radially expanded state, and first and second solid end core structures that support first and second end portions of the elastomeric tube in a radially expanded state. Each solid core structure has a film disposed on at least an inner surface thereof having a coefficient of friction less than or equal to 0.05.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
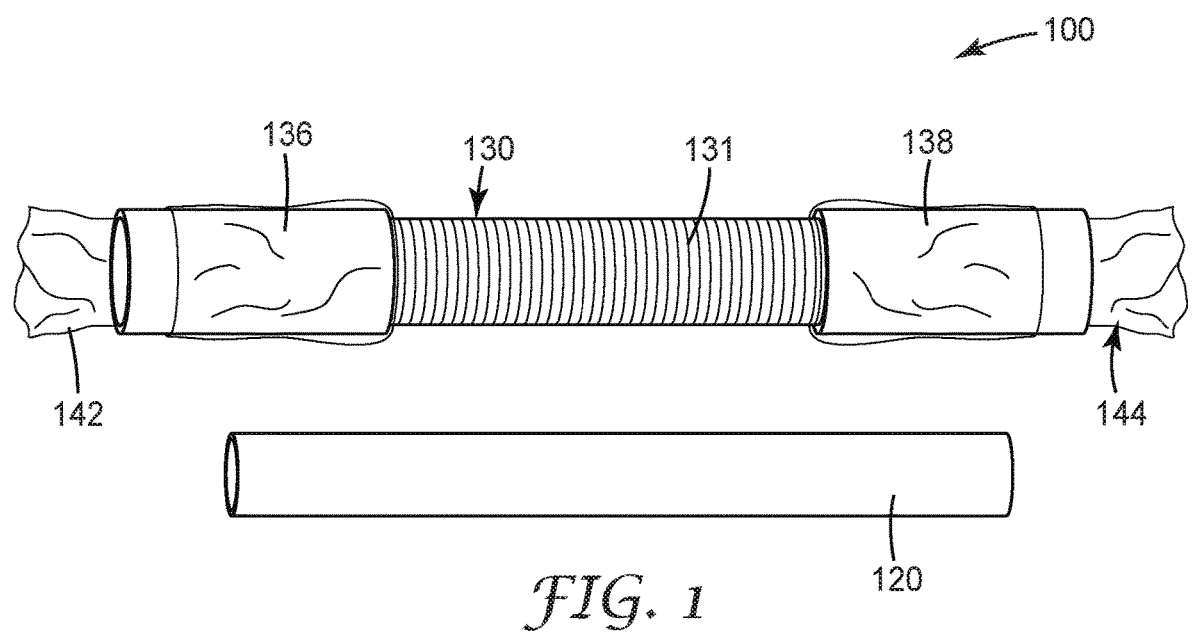
FIG. 1 is an isometric view of a cover assembly according to a first embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a cover assembly for a cable, such as a power cable, having an elastomeric tube placed in a radially stretched condition using a hybrid core structure. The hybrid core structure includes a central portion formed from a spirally wound ribbon and two solid end portions that can be removed in a straightforward manner. The structure and composition of the hybrid core structure is especially useful for deployment of elastomeric tubes having higher recovery forces.

Figure 2:
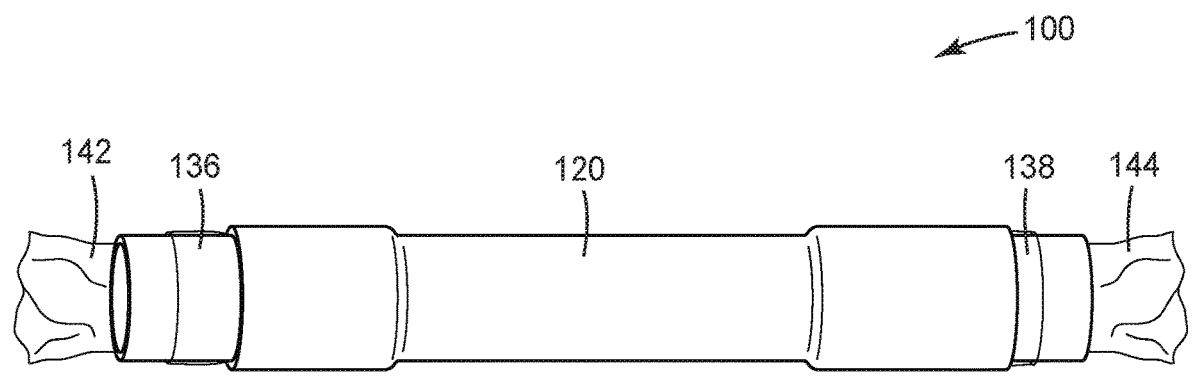
FIG. 2 is the cover assembly of FIG. 1 with the PST disposed in stretched formed over the hybrid core structure according to an embodiment of the invention.

FIGS. 1 and 2 show a first embodiment of the present application, a cover assembly 100. Cover assembly 100 comprises an elastomeric, pre-stretched tube (PST) 120 (shown in relaxed form in FIG. 1 and in a radially stretched form in FIG. 2). The cover assembly 100 also includes a hybrid core 130 having a central core structure 131 and solid end core structures 136 and 138, disposed at each end of the central core structure 131. As shown in FIG. 2, the hybrid core 130 is used to maintain PST 120 in a radially stretched condition prior to deployment of the cover assembly on a cable. PST 120 and hybrid core 130 each have substantially circular cross-sections and axes which are generally collinear when assembled into closure assembly 100.

PST 120 may be constructed of a rubber or other material(s) depending upon the application. In one aspect, PST 120 comprises a multilayer structure having a silicone rubber splice body, with an EPDM rubber outer jacket and a metallic ground sock. Alternatively, PST 120 can comprise an elastomer such as natural rubber, styrene-butadiene rubber, NBR, acrylic rubber, urethane rubber or ethylene propylene rubber (this list is not meant to be exhaustive). PST 120 may have integrally formed portions for stress control, conductivity, etc. In one aspect of the invention, the PST 120 can have a thickness of about 0.1 inches to about 10 inches (especially for shed modules).

Central core structure 131 may be formed in many ways, such as by ultrasonically welding the adjacent edges of the helically wound strip or ribbon to form a perforation along the helical seam, or using an interlocking fit as taught in U.S.

patent application Ser. No. 08/384,516. The central core 131 is preferably formed from a durable, flexible polymer such as cellulose acetate, butyrate, polypropylene, polyethylene, polyvinylchloride (PVC), polyphenylene oxide (PPO), acrylonitrile butadiene styrene (ABS), polycarbonate, etc. In some aspects, the thickness of the central core structure may be from about 0.06 inches to about 0.2 inches, and in other aspects, the thickness of the central core structure can be greater, depending on the recovery force of the PST. In a preferred aspect, the central core has an axial length of 4-8 inches.

Figure 3:
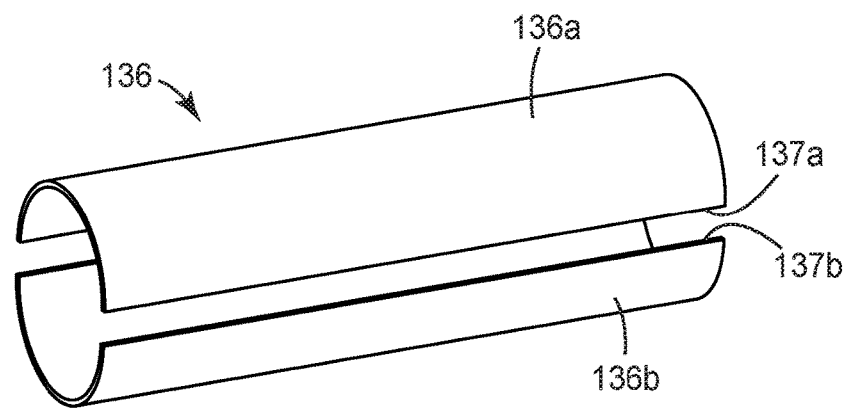
FIG. 3 is a close up isometric view of an exemplary solid end core according to an embodiment of the invention.

The solid end cores 136 and 138 each comprise multipiece structures. For example, FIG. 3 show an example solid end core 136 that comprises a two piece clam shell structure (pieces 136a, 136b) that are joined along edges 137a, 137b. The solid end cores can comprise an extrudable, durable polymer, such as such as polyethylene, polypropylene, polyoxymethylene, high impact polystyrene (HIP), PVC, etc. In addition, the material used to form solid end cores 136, 138, can include a one or more additives to provide a low coefficient of friction. In one aspect, the solid end cores can each comprise a PE material having a lubricating additive (such a material is commercially available from Artek). The solid end cores can have a thickness of about 0.080 in. to about 0.20 in. and an axial length of from about 4 in. to about 24 in., or even longer depending on the combination of PST material recovery force and the coefficient of friction of the surfaces.

To create the hybrid core structure, the outer diameter of the central core structure is slightly less than the inner diameter of the solid end cores, so that each of the solid end cores can be placed at an end of the central core structure, such as shown in FIG. 1. In this manner, when in use to place the PST 120 in a radially stretched condition, the central core structure 131 can be easily removed, while the solid end cores maintain the stretched condition of the end portions of the PST 120. In this manner, this hybrid core structure allows for proper positioning of the cover assembly 100 over a cable at a particular location, e.g., at a splice or cable repair location.

The cover assembly 100 also includes a release film for aiding in the deployment of the PST. For example, as shown in FIGS. 1 and 2, a release film 142 covers an outer and an inner surface of solid end core structure 136 and a release film 144 covers an outer and an inner surface of solid end core structure 138. In a preferred aspect, the release film 142, 144 comprises a conventional polymer film, such as a PET film. In addition, at least one side of the film 142, 144, such as the film side that is in contact with the surfaces of solid end cores 136, 138, respectively, can be coated with a low friction material, such as silicone. Thus, the combination of a solid end core material and a release film, each with a low coefficient of friction, allows for the removal of the end cores, and deployment of the PST, with a relatively low amount of axial pulling force. As is shown in the experiment section below, the ratio of the off-loading force to the friction holding force can be at least 1, which allows for the use of thicker PSTs, which can have a high recovery force. Such thicker PSTs can be very difficult to deploy, especially in environments with limited space or accessibility, when substantial axial pulling forces are required for solid core removal.

Experiments

Experiments were performed to determine the coefficient of friction of the release film/solid end core. The measurements were performed by using a small Instron to exert a known force (normal force) onto a metal cylinder which was pushing on the film that was in contact with a plastic plaque formed from the same material as the solid end core. The plaques were placed on a low friction linear bearing which could be pushed or pulled with a second force gauge to give the magnitude of the axial force needed to slide the release film over the plastic plaque. The coefficient of friction was calculated as the ratio of axial force to normal force.

To verify the plaque data, expanded elastomers of known recovery force were loaded onto plastic cylinders and the axial force necessary to move the elastomers was measured by a force gauge and the ratio of axial force to the normal force supplied by the elastomer was used to calculate the coefficient of friction. Comparative samples of untreated release films were also tested.

The results of a first test are provided in Table 1.

TABLE 1

| Molded Sample Plaque tests with Polymers with slip additive (PE = polyethylene, HIP = high impact polystyrene, PP = polypropylene) | Lowparex PET Film side treated yes or no on plastic | Test Dia | area | force (lbs) | Pressure (psi) | Axial force (lb) | Cof (coefficient of friction) |
|---|---|---|---|---|---|---|---|
| | | 1 | 0.785 | 40 | 51.0 | | |
| PE5202 | yes | 1 | 0.785 | 40 | 51.0 | 5 | 0.125 |
| PE5202 + 5% MB50-34 | yes | 1 | 0.785 | 40 | 51.0 | 3 | 0.075 |
| PE5202 + 20% MB50-34 | yes | 1 | 0.785 | 40 | 51.0 | 2 | 0.050 |
| PE5202 | no | 1 | 0.785 | 40 | 51.0 | 6.5 | 0.163 |
| PE5202 + 5% MB50-34 | no | 1 | 0.785 | 40 | 51.0 | 5.5 | 0.138 |
| PE5202 + 20% MB50-34 | no | 1 | 0.785 | 40 | 51.0 | 3 | 0.075 |
| | | 1 | 0.785 | 40 | 51.0 | | |
| HIP 6429 | yes | 1 | 0.785 | 40 | 51.0 | 4 | 0.100 |
| HIP 6429 + 5% MB50-34 | yes | 1 | 0.785 | 40 | 51.0 | 3 | 0.075 |
| HIP 6429 + 20% MB50-34 | yes | 1 | 0.785 | 40 | 51.0 | 2 | 0.050 |
| HIP 6429 | no | 1 | 0.785 | 40 | 51.0 | 6.5 | 0.163 |
| HIP 6429 + 5% MB50-34 | no | 1 | 0.785 | 40 | 51.0 | 4 | 0.100 |
| HIP 6429 + 20% MB50-34 | no | 1 | 0.785 | 40 | 51.0 | 2.5 | 0.063 |
| | | 1 | 0.785 | 40 | 51.0 | | |
| PP 7823 | yes | 1 | 0.785 | 40 | 51.0 | 5 | 0.125 |
| PP 7823 + 5% MB50-34 | yes | 1 | 0.785 | 40 | 51.0 | 4.5 | 0.113 |
| PP 7823 + 20% MB50-34 | yes | 1 | 0.785 | 40 | 51.0 | 3 | 0.075 |
| PP 7823 | no | 1 | 0.785 | 40 | 51.0 | 7.5 | 0.188 |
| PP 7823 + 5% MB50-34 | no | 1 | 0.785 | 40 | 51.0 | 7.5 | 0.188 |

TABLE 1-continued

| Molded Sample Plaque tests with Polymers with slip additive (PE = polyethylene, HIP = high impact polystyrene, PP = polypropylene) | Lowparex PET Film side treated yes or no on plastic | Test Dia | area | force (lbs) | Pressure (psi) | Axial force (lb) | Cof (coefficient of friction) |
|---|---|---|---|---|---|---|---|
| PP 7823 + 20% MB50-34 | no | 1 | 0.785 | 40 | 51.0 | 5 | 0.125 |
| PE (super lubricous, from Artek) + PET (Lowparex) with Silicone coating | yes | 1 | 0.785 | 40 | 51.0 | 1.5 | 0.038 |
| | yes | 1 | 0.785 | 65 | 82.8 | 2 | 0.031 |
| | yes | 1 | 0.785 | 85 | 108.3 | 2.5 | 0.029 |
| | yes | 1 | 0.785 | 50 | 63.7 | 1 | 0.020 |

In another experiment, EPDM elastomeric tubes were expanded onto two solid cores, each having a release film disposed thereon, as explained herein, where one solid core comprised a PE having a low coefficient of friction additive, and the other comprised a PE material without that additive. Both assemblies had the same force applied on their surfaces. Measurement of the axial force required to move the elastomeric tubes was determined and the coefficient of friction was determined by calculating the ratio of surface force to the axial force.

TABLE 2

| | | | |
|---|---|---|---|
| Total force on cylindrical core | 443 | lb | COF |
| Axial force for PE core with coated PET film | 22 | lb | 0.050 |
| Axial force for core with additive and with coated PET film | 12 | lb | 0.027 |

The experiments shown in Tables 1 and 2 showed that the COF determined from flat plaque experiments was consistent with the experiments using cylindrical cores with expanded elastomeric tubes.

In another experiment, the ratio of the off-loading force to the friction holding force was calculated for a number of different samples under different conditions using the data from experiments on the coefficient of friction and the force exerted by the elastomer. The results are shown in Table 3.

TABLE 3

| Elastomer tube # | Part Length on solid core sections to unload (in) | COF Measured Coefficient of friction | Total normal force exerted by elastomer (lbs.) | Calculated Axial holding force due to friction (lbs.) | Axial unloading force supplied by drop down to application OD | Additional Axial Force applied by Person (lbs.) | Ratio of Off-loading force to friction holding force |
|---|---|---|---|---|---|---|---|
| 1 | 20 | 0.09 | 5710 | 514 | 82 | 30 | 0.22 |
| 2 | 10 | 0.09 | 2855 | 257 | 82 | 30 | 0.44 |
| 3 | 4 | 0.09 | 1142 | 103 | 82 | 30 | 1.09 |
| 4 | 4 | 0.1 | 1306 | 131 | 101 | 30 | 1.00 |
| 5 | 4 | 0.1 | 1306 | 131 | 99 | 30 | 0.99 |
| 6 | 4 | 0.03 | 1306 | 39 | 101 | 0 | 2.57 |
| 7 | 4 | 0.03 | 1306 | 39 | 99 | 0 | 2.54 |
| 8 | 24 | 0.03 | 6406 | 192 | 178 | 20 | 1.03 |
| 9 | 7 | 0.03 | 2396 | 72 | 122 | 0 | 1.69 |
| 10 | 7 | 0.03 | 2022 | 61 | 80 | 0 | 1.32 |

The combination of a PET film on a plastic core sample (such as is used with conventional products) can result in an overall coefficient of friction of about ~0.09 to 0.1. Samples using the solid end cores and release films described in the preferred aspects of the invention above can achieve a much lower coefficient of friction of 0.05 or lower, which allows for the use of even longer length solid cores, if needed.

For example, a comfortable limit (meaning an additional 30 lb. of human effort would be required) of a solid core would be about 4 inches in axial length, thereby lowering the COF to 0.03, which can eliminate the need for additional axial pulling force.

As shown in Table 3, tube examples 6 and 7 exhibit a ratio of the off-loading force to the friction holding force of greater than 1, in these specific examples, greater than 2, thus significantly reducing the amount of axial pull force needed to remove the solid core from an elastomeric tube and allowing straightforward deployment of a cover assembly.

As can also be noted in Table 3, as the coefficient of friction is reduced, longer solid cores can be utilized and/or elastomers with higher recovery forces can be deployed with solid cores. Also the segment of spiral core enables leveraging a portion of the recovering elastomeric force to aide in pulling off the remaining elastomer on the solid core.

Various modifications, equivalent processes, as well as numerous structures to which the present invention may be applicable will be readily apparent to those of skill in the art to which the present invention is directed upon review of the present specification.

We claim:

1. An assembly for covering at least a portion of a cable, comprising:
    an elastomeric tube; and
    a hybrid support core structure, having
        a central core structure formed from a spirally wound separable ribbon that supports a central portion of the elastomeric tube in a radially expanded state, and
        first and second solid end core structures that support first and second end portions of the elastomeric tube in a radially expanded state, each solid core structure having a film disposed on at least an inner surface thereof having a coefficient of friction less than or equal to 0.05.

2. The assembly of claim 1, wherein a ratio of the off-loading force to the friction holding force is at least 1.

3. The assembly of claim 1, wherein each solid core structure having a film disposed on at least an inner surface thereof having a coefficient of friction less than or equal to 0.03.

4. The assembly of claim 1, wherein at least one of the first and second solid core structures is formed from a two piece structure.

5. The assembly of claim 1, wherein the film comprises a polymer release film having a silicone coating disposed on at least one major surface thereof.

6. The assembly of claim 1, wherein the first and second solid end core structures each comprise a PE material with a lubricating additive.

* * * * *